(12) United States Patent
Yamazaki (10) Patent No.: US 11,630,088 B2
(45) Date of Patent: Apr. 18, 2023

(54) PREPARATIVE LIQUID CHROMATOGRAPHY SYSTEM

(71) Applicant: SHIMADZU CORPORATION, Kyoto (JP)

(72) Inventor: Tomoyuki Yamazaki, Kyoto (JP)

(73) Assignee: Shimadzu Corporation, Kyoto (JP)

(*) Notice: Subject to any disclaimer, the term of this patent is extended or adjusted under 35 U.S.C. 154(b) by 118 days.

(21) Appl. No.: 17/215,081

(22) Filed: Mar. 29, 2021

(65) Prior Publication Data

US 2021/0310997 A1     Oct. 7, 2021

(30) Foreign Application Priority Data

Apr. 3, 2020   (JP) .............................. JP2020-067430

(51) Int. Cl.
    *G01N 30/06*     (2006.01)
    *G01N 35/10*     (2006.01)
    *G01N 30/02*     (2006.01)

(52) U.S. Cl.
    CPC ......... *G01N 30/06* (2013.01); *G01N 35/1065* (2013.01); *G01N 2030/027* (2013.01)

(58) Field of Classification Search
    USPC ....................................................... 73/61.52
    See application file for complete search history.

(56) References Cited

U.S. PATENT DOCUMENTS

| | | | | |
|---|---|---|---|---|
| 4,837,157 A | * | 6/1989 | Turnell | G01N 30/06 210/659 |
| 2011/0184658 A1 | * | 7/2011 | Maruyama | G01N 30/82 702/25 |

(Continued)

FOREIGN PATENT DOCUMENTS

| | | |
|---|---|---|
| CN | 102124329 A | 7/2011 |
| JP | 2000-162217 A | 6/2000 |

OTHER PUBLICATIONS

Office Action for corresponding CN Application No. 20210258927. 5, dated Jan. 28, 2023, with English language machine translation.

*Primary Examiner* — Peter J Macchiarolo
*Assistant Examiner* — Mohammed E Keramet-Amircolai
(74) *Attorney, Agent, or Firm* — Renner, Otto, Boisselle & Sklar, LLP (57) ABSTRACT

Automation of the collection and reinjection of a sample into a large number of containers is made possible without increasing the size of a liquid handler itself. A preparative liquid chromatography system includes a liquid delivery part (2) that feeds a mobile phase, a separation column (14A; 14B) for separating a sample transported by the mobile phase, a plurality of liquid handlers (6-1 to 6-n), each of which independently including a container arrangement portion (18) in which a plurality of containers for containing a sample are disposed, an injecting part (20A) configured to suck a sample from a container disposed in the container arrangement portion (18) and hold it, and to inject the sample into the mobile phase fed by the liquid delivery part (2) by being interposed between the liquid delivery part (2) and the separation column (14A), and a fractionation part (22) configured to collect a sample eluted from the separation column (14A) so that the sample is fractionated to containers disposed in the container arrangement portion (18), an injection switching part (4) configured to selectively interpose one of the injecting parts (20A) of the plurality of liquid handlers (6-1 to 6-n) between the liquid delivery part (2) and the separation column (14A) by switching connection of channels at a position between the liquid delivery part (2) and the separation column (14A), and a fractionation switching part (12) configured to selectively connect one of the fractionation parts (22) of the plurality of liquid handlers (6-1 to 6-n) to a downstream side of the separation column (Continued)

(14A) by switching connection of channels at a position downstream of the separation column (14A).

8 Claims, 4 Drawing Sheets

(56) References Cited

U.S. PATENT DOCUMENTS

| | | | | |
|---|---|---|---|---|
| 2013/0306537 A1* | 11/2013 | Yamazaki | ............... | B01D 15/22 |
| | | | | 210/198.2 |
| 2019/0212310 A1* | 7/2019 | Yoshino | ................. | G01N 30/32 |
| 2019/0302065 A1* | 10/2019 | Yamazaki | ............... | G01N 30/06 |
| 2019/0391117 A1* | 12/2019 | Yamazaki | ............... | G01N 30/80 |
| 2021/0310997 A1* | 10/2021 | Yamazaki | ............... | G01N 30/06 |

* cited by examiner

PREPARATIVE LIQUID CHROMATOGRAPHY SYSTEM

BACKGROUND OF THE INVENTION

1. Field of the Invention

The present invention relates to a preparative liquid chromatography system.

2. Description of the Related Art

In a preparative liquid chromatography, a sample is separated by liquid chromatography, and a component in the separated sample is fractionated into an individual container and collected. A system for performing preparative liquid chromatography is built by combining devices, such as a liquid delivery device that feeds a mobile phase, an autosampler that injects a sample into the mobile phase, a column oven that houses a separation column inside and adjusts the temperature of the separation column, a detector that detects the sample eluted from the separation column, and a fraction collector that fractionates and collects the sample eluted from the separation column into an individual collection container based on a detection signal obtained by the detector.

SUMMARY OF THE INVENTION

In the preparative liquid chromatography system as described above, since the autosampler and the fraction collector are separate devices, it is not possible to automatically reinject the sample fractionated into the collection container by the fraction collector. In order to reinject the sample collected in the collection container, the user needs to manually move the collection container placed in the fraction collector into the autosampler.

As a device for liquid chromatography, there exists a liquid handler having the functions of an autosampler and a fraction collector (see Japanese Patent Laid-open Publication No. 2000-162217). If a preparative liquid chromatography system using a liquid handler is built, not only fractionation of a sample separated by liquid chromatography but also reinjection of the fractionated sample can be automatically executed.

In a case where the number of components contained in a sample is large, it may be desired to fractionate and collect the sample eluted from the separation column in a large number of containers. In contrast, there is a limit to the number of collection containers that can be installed in the liquid handler. For this reason, in a case where it is desired to fractionate and collect more samples than collection containers that can be installed in the liquid handler, it is necessary to connect a fraction collector separately from the liquid handler. However, the fraction collector cannot automatically reinject the sample collected in the collection container. Accordingly, in a case where it is desired to reinject the sample collected by the fraction collector, it is necessary for the user to manually move the collection container as the target of reinjection from the fraction collector to the liquid handler.

It is conceivable to sufficiently increase the number of containers that can be installed in the liquid handler. However, this will increase the size of the liquid handler itself and increase the installation area of the system. Further, since the number of times of fractionation and collection differs depending on a sample handled by the user, there is a concern that the installation area and cost of the system are increased more than necessary in some cases.

The present invention has been made in view of the above problems, and an object of the present invention is to make it possible to automate fractionation and collection of a sample into a large number of containers and the reinjection of the fractionated and collected sample without increasing the size of the liquid handler itself.

A preparative liquid chromatography system according to the present invention includes a liquid delivery part that feeds a mobile phase, a separation column for separating a sample transported by the mobile phase, a plurality of liquid handlers, each of which independently including a container arrangement portion in which a plurality of containers for containing a sample are disposed, an injecting part configured to suck a sample from a container disposed in the container arrangement portion and hold it, and to inject the sample into the mobile phase fed by the liquid delivery part by being interposed between the liquid delivery part and the separation column, and a fractionation part configured to collect a sample eluted from the separation column so that the sample is fractionated to containers disposed in the container arrangement portion, an injection switching part configured to selectively interposes one of the injecting parts of the plurality of liquid handlers between the liquid delivery part and the separation column by switching connection of channels at a position between the liquid delivery part and the separation column, and a fractionation switching part configured to selectively connect one of the fractionation parts of the plurality of liquid handlers to downstream of the separation column by switching connection of channels as a position downstream of the separation column.

The liquid handler used in the present invention includes an injecting part that realizes an autosampler function and a fractionation part that realizes a fraction collector function. In the present invention, a plurality of such liquid handlers are used in one system. Specifically, a liquid handler of an injecting part to be used is selected from a plurality of liquid handlers by the injection switching part, the injecting part of the selected liquid handler is caused to function as an autosampler, a liquid handler of a fractionation part to be used is selected from a plurality of liquid handlers by the fractionation switching part, and the fractionation part of the selected liquid handler is caused to function as a fraction collector. The number of the liquid handlers is determined by the number of containers required to fractionate and collect a sample eluted from the separation column.

In the preparative liquid chromatography system according to the present invention, a liquid handler of an injecting part to be used is selected from a plurality of liquid handlers by the injection switching part, the injecting part of the selected liquid handler is caused to function as an autosampler, a liquid handler of a fractionation part to be used is selected from a plurality of liquid handlers by the fractionation switching part, and the fractionation part of the selected liquid handler is caused to function as a fraction collector. Accordingly, fractionation and collection of a sample into a larger number of containers than the number of containers that can be installed in one liquid handler and reinjection of the fractionated and collected sample can be automatically performed without increasing the size of the liquid handler itself.

DETAILED DESCRIPTION OF THE INVENTION

Hereinafter, an embodiment of the preparative liquid chromatography system according to the present invention will be described with reference to the drawings.

Figure 1:
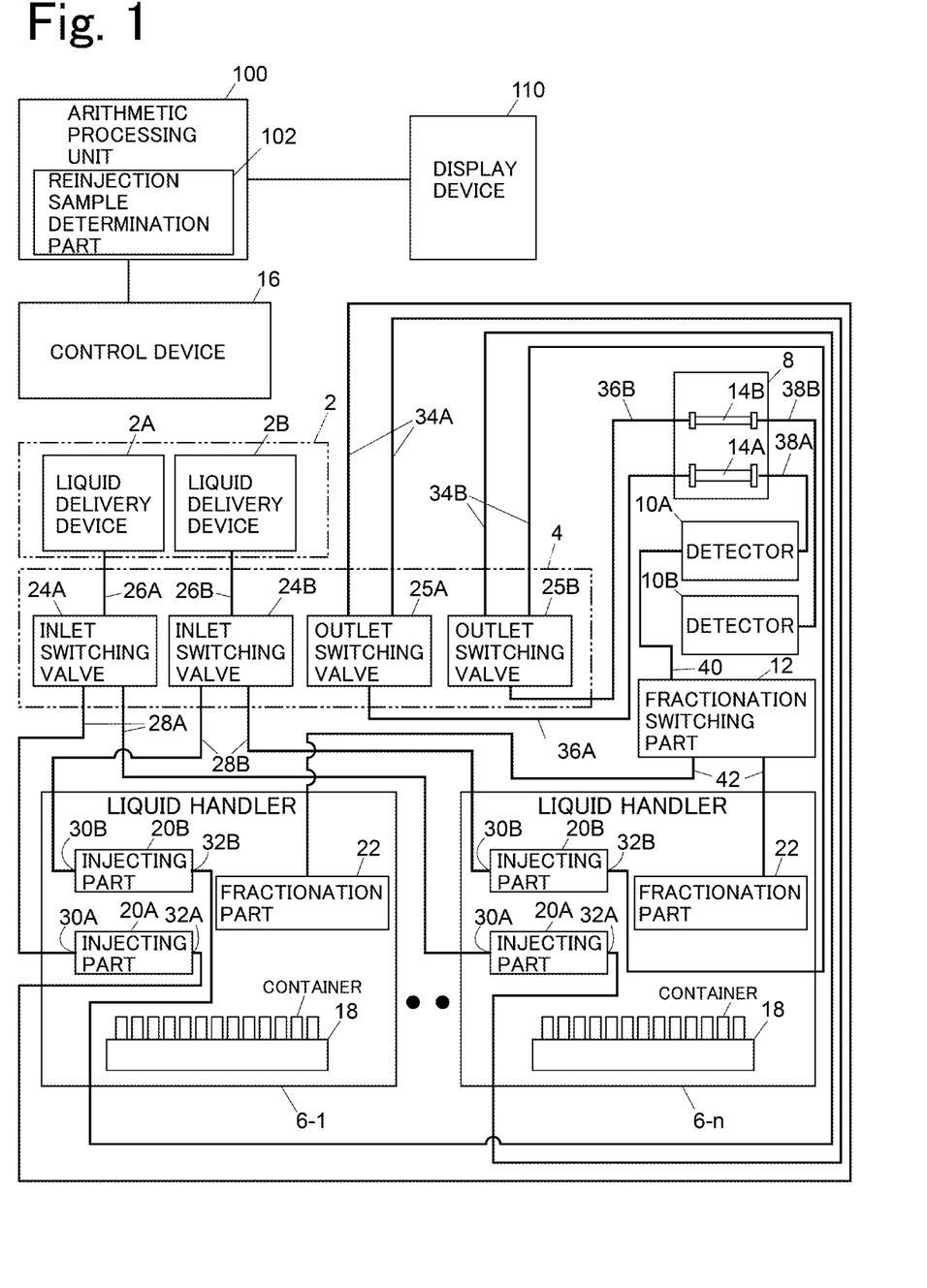
FIG. 1 is a block diagram schematically illustrating an embodiment of a preparative liquid chromatography system.

As shown in FIG. 1, the preparative liquid chromatography system of the present embodiment has a liquid delivery part 2, an injection switching part 4, and n (n is an integer of 2 or more) liquid handlers 6-1 to 6-$n$, a column oven 8, a detector 10A, a detector 10B, a fractionation switching part 12, a control device 16, an arithmetic processing unit 100, and a display device 110.

The liquid delivery part 2 includes a liquid delivery device 2A and a liquid delivery device 2B that feed a mobile phase independently of each other.

The injection switching part 4 includes an inlet switching valve 24A, an inlet switching valve 24B (=second inlet switching valve), an outlet switching valve 25A, and an outlet switching valve 25B (=second outlet switching valve). Each of the inlet switching valve 24A, the inlet switching valve 24B, the outlet switching valve 25A, and the outlet switching valve 25B has one common port and a plurality of selection ports, and is configured to selectively establish fluid communication between the common port and any one of the selection ports.

A separation column 14A and a separation column 14B (=second separation column) are housed in the column oven 8. The separation column 14A and the separation column 14B have different separation characteristics because at least one of a separation medium with which the inside is filled, an inner diameter, and a column length is different from each other. Note that the separation column 14A and the separation column 14B may have the same separation characteristics.

Each of the liquid handlers 6-1 to 6-$n$ is provided with a container arrangement portion 18 in which a plurality of containers for containing a sample are disposed. Each of the liquid handlers 6-1 to 6-$n$ includes an injecting part 20A, an injecting part 20B (second injecting part), and a fractionation part 22. Each of the injecting part 20A and the injecting part 20B realizes a function as an autosampler that collects a sample from the container arranged in the container arrangement portion 18 and injects the sample into a mobile phase. The fractionation part 22 realizes a function as a fraction collector that fractionates a sample eluted from the separation column 14A and collects the sample in an individual container arranged in the container arrangement portion 18.

The liquid delivery device 2A is connected to the common port of the inlet switching valve 24A via a channel 26A. The selection port of the inlet switching valve 24A is connected to a channel 28A leading to an inlet port 30A of each of the injecting parts 20A of the liquid handlers 6-1 to 6-$n$. That is, the inlet switching valve 24A selectively connects the liquid delivery device 2A to the inlet port of the injecting part 20A of any one of the liquid handlers 6-1 to 6-$n$.

An outlet port 32A of each of the injecting parts 20A of the liquid handlers 6-1 to 6-$n$ is connected to the selection port of the outlet switching valve 25A via a channel 34A. The common port of the outlet switching valve 25A is connected to the inlet of the separation column 14A via a channel 36A. That is, the outlet switching valve 25A selectively connects the outlet port of the injecting part 20A of the liquid handler of any one of the liquid handlers 6-1 to 6-$n$ to the separation column 14A.

The liquid delivery device 2B is connected to the common port of the inlet switching valve 24B via a channel 26B. The selection port of the inlet switching valve 24B is connected to a channel 28A leading to an inlet port 30B of each of the injecting parts 20B of the liquid handlers 6-1 to 6-$n$. That is, the inlet switching valve 24B selectively connects the liquid delivery device 2B to the inlet port of the injecting part 20B of any one of the liquid handlers 6-1 to 6-$n$.

An outlet port 32B of each of the injecting parts 20B of the liquid handlers 6-1 to 6-$n$ is connected to the selection port of the outlet switching valve 25B via a channel 34B. The common port of the outlet switching valve 25B is connected to the inlet of the separation column 14B via a channel 36B. That is, the outlet switching valve 25B selectively connects the outlet port of the injecting part 20B of the liquid handler of any one of the liquid handlers 6-1 to 6-$n$ to the separation column 14B.

The inlet switching valve 24A and the outlet switching valve 25A can be switched in conjunction with each other so that the injecting part 20A of the liquid handler of any one of the liquid handlers 6-1 to 6-$n$ is interposed between the liquid delivery device 2A and the separation column 14A. The inlet switching valve 24B and the outlet switching valve 25B can be switched in conjunction with each other so that the injecting part 20B of the liquid handler of any one of the liquid handlers 6-1 to 6-$n$ is interposed between the liquid delivery device 2B and the separation column 14B.

The outlet of the separation column 14A is connected to the inlet of the detector 10A via a channel 38A, and the outlet of the detector 10A is connected to the common port of the fractionation switching part 12 via a channel 40. The outlet of the separation column 14B is connected to the inlet of the detector 10B via a channel 38B. The fractionation switching part 12 is a switching valve having one common port and a plurality of selection ports, and is configured to selectively establish fluid communication between the common port and any one of the selection ports. A channel 42 leading to each of the fractionation parts 22 of the liquid handlers 6-1 to 6-$n$ is connected to each of the selection ports of the fractionation switching part 12. That is, the fractionation switching part 12 selectively connects the fractionation part 22 of any one of the liquid handlers 6-1 to 6-$n$ to the outlet of the detector 10A.

The internal capacities of the injecting parts 20A of the liquid handlers 6-1 to 6-$n$ are substantially the same as each other, and the internal capacities of the injecting parts 20B of the liquid handlers 6-1 to 6-$n$ are substantially the same as each other. Then, all the channels 28A have substantially the same internal capacities as each other, all the channels 28B have substantially the same internal capacities as each other, all the channels 34A have substantially the same internal capacities as each other, and all the channels 34B have substantially the same internal capacities as each other. For this reason, even in a case where the sample is injected using any of the liquid handlers 6-1 to 6-$n$, the internal capacity in the system up to the separation columns 14A and 14B becomes uniform and the influence of an individual difference between the liquid handlers on the separation data is reduced.

The control device 16 is realized by an electronic circuit (for example, a system controller) including a central processing unit (CPU), a storage device, and the like. The arithmetic processing unit 100 is communicably connected to the control device 16. The arithmetic processing unit 100 is realized by a general-purpose or dedicated computer. The arithmetic processing unit 100 has a function of creating a chromatogram based on the detection signals acquired by the detectors 10A and 10B, and a function of performing various types of arithmetic processing. The display device 110 such as a liquid crystal display is electrically connected to the arithmetic processing unit 100, and various pieces of information are displayed on the display device 110.

The user performs setting of a condition for separation and fractionation or analysis and the like through the arithmetic processing unit 100. Information on the condition set by the user is transmitted to the control device 16. The control device 16 performs operation control of the liquid delivery device 2A, the liquid delivery device 2B, the inlet switching valve 24A, the inlet switching valve 24B, the outlet switching valve 25A, the outlet switching valve 25B, the liquid handlers 6-1 to 6-$n$, the column oven 8, the detector 10A, the detector 10B, and the fractionation switching part 12 based on information transmitted from the arithmetic processing unit 100.

Figure 2:
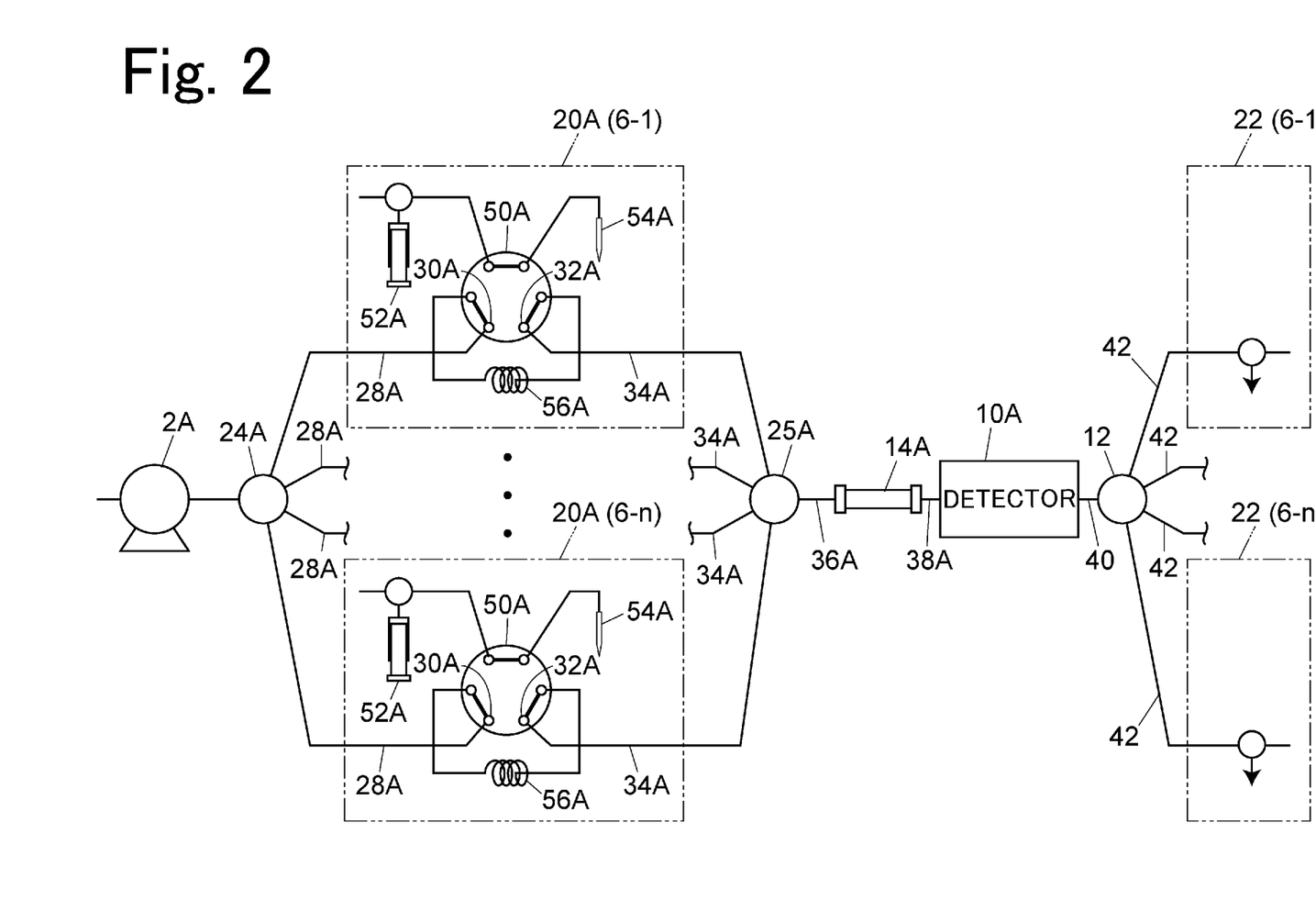
FIG. 2 is a channel configuration diagram of a liquid chromatograph for separation and fractionation realized by the embodiment.
Figure 3:
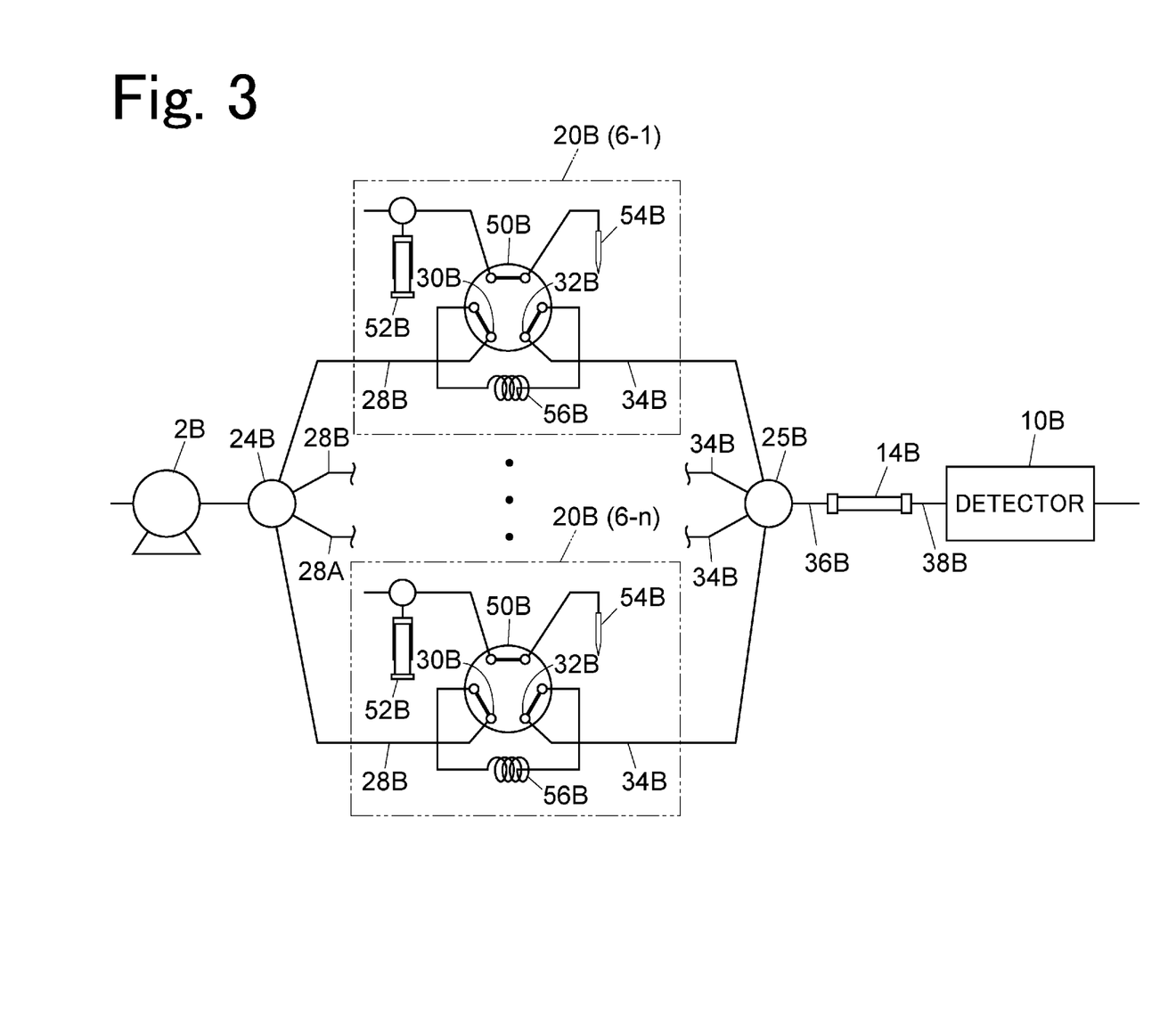
FIG. 3 is a channel configuration diagram of a liquid chromatograph for analysis realized by the embodiment.

With the above configuration, the liquid chromatograph for separation and fractionation illustrated in FIG. 2 and the liquid chromatograph for analysis illustrated in FIG. 3 are built.

In a case where separation and fractionation of a sample are performed, the liquid chromatograph for separation and fractionation is used. As shown in FIG. 2, in the liquid chromatograph for separation and fractionation, the injecting part 20A of any of the liquid handlers 6-1 to 6-$n$ is selectively interposed between the liquid delivery device 2A and the separation column 14A and the liquid handlers 6-1 to 6-$n$, and the fractionation part 22 of any of the liquid handlers 6-1 to 6-$n$ is selectively connected to the downstream side of the detector 10A.

Each of the injecting parts 20A of the liquid handlers 6-1 to 6-$n$ is provided with a high pressure valve 50A, a syringe pump 52A, a needle 54A, and a sample loop 56A. The high pressure valve 50A has a plurality of ports and switches a connection state between the ports. One port of the high pressure valve 50A is the inlet port 30A connected to the inlet switching valve 24A via the channel 28A, and another port of the high pressure valve 50A is the outlet port 32A connected to the outlet switching valve 25A via the channel 34A. The syringe pump 52A, the needle 54A, and the sample loop 56A are connected to other ports of the high pressure port 50A. The syringe pump 52A is for collecting a sample through the needle 54A, and the sample loop 56A is for holding the sample collected by the needle 54A.

The injecting part 20A is in a state of either one of a state where the sample loop 56A is interposed between the inlet switching valve 24A and the outlet switching valve 25A and a state where the inlet switching valve 24A and the outlet switching valve 25A are connected without the sample loop 56A interposed between them by switching of the high pressure valve 50A. That is, the injecting part 20A holds a sample collected through the needle 54A in the sample loop 56A, and then interposes the sample loop 56A between the liquid delivery device 2A and the separation column 14A, so as to inject the sample into a mobile phase from the liquid delivery device 2A.

The sample injected into the mobile phase from the liquid delivery device 2A by the injecting part 20A is transported to the separation column 14A and separated in time. The sample separated by the separation column 14A is introduced into the fractionation part 22 of any of the liquid handlers 6-1 to 6-$n$ via the detector 10A. The operation of the fractionation part 22 is controlled based on the detection signal obtained by the detector 10A. By the control, the sample separated by the separation column 14A is fractionated and collected in an individual container according to a preset condition.

Note that the sample injected into the mobile phase from the liquid delivery device 2A by the injecting part 20A may be a sample after being fractionated and collected in an individual container by the above-mentioned preparative chromatography. That is, the sample fractionated and collected in an individual container may be reinjected into the mobile phase from the liquid delivery device 2A.

In a case where reanalysis of a sample fractionated and collected in an individual container by the above preparative chromatography is performed, the liquid chromatograph for analysis can also be used. As shown in FIG. 3, in the liquid chromatograph for analysis, the injecting part 20B of any of the liquid handlers 6-1 to 6-$n$ is selectively interposed between the liquid delivery device 2B and the separation column 14B by the inlet switching valve 24B and the outlet switching valve 25B.

Each of the injecting parts 20B of the liquid handlers 6-1 to 6-$n$ has the same configuration as the injecting part 20A, and holds the sample collected through the needle 54B in the sample loop 56B, and then interposes the sample loop 56B between the liquid delivery device 2B and the separation column 14B, so as to inject the sample into a mobile phase from the liquid delivery device 2B.

The sample injected into the mobile phase from the liquid delivery device 2B by the injecting part 20B is transported to the separation column 14B, separated in time, and detected by the detector 10B.

Returning to FIG. 1, the arithmetic processing unit 100 includes a reinjection sample determination part 102. The reinjection sample determination part 102 is a function obtained by the CPU executing a predetermined program. The reinjection sample determination part 102 is configured to determine a sample designated by the user in fractionated and collected samples as a sample to be reinjected.

Figure 4:
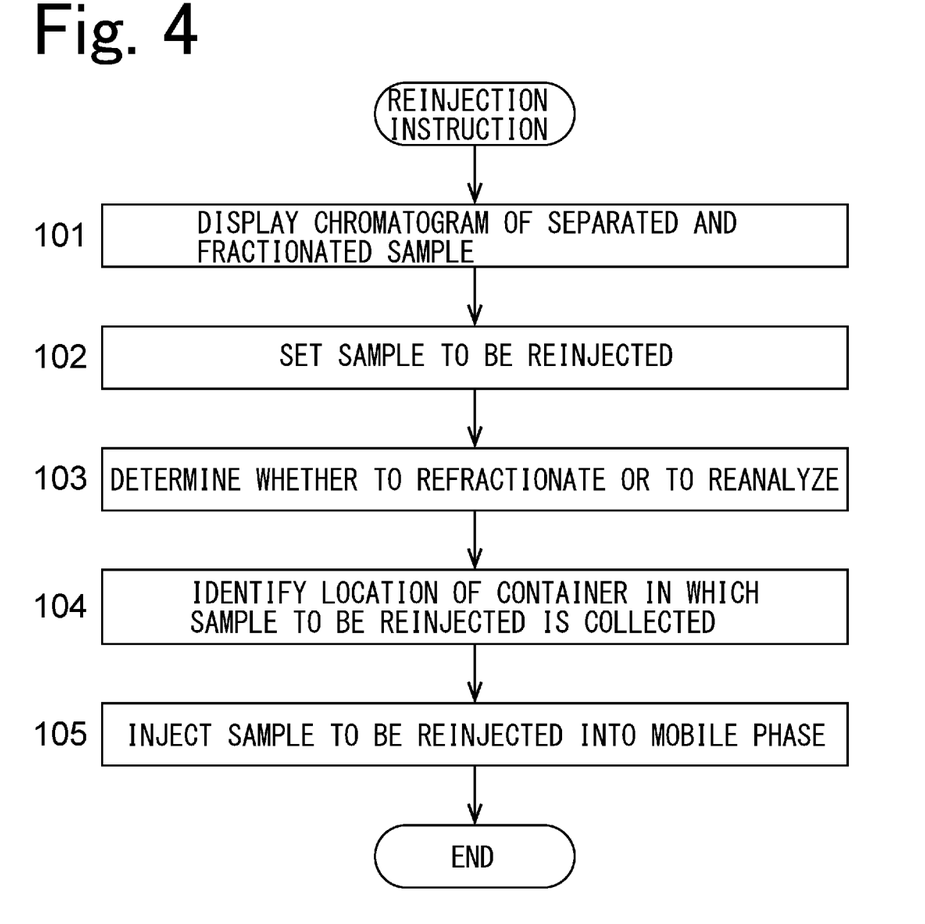
FIG. 4 is a flowchart illustrating an example of operation at the time of reinjection in the embodiment.

The operation of reinjecting the sample fractionated and collected into an individual container will be described with reference to FIG. 1 as well as the flowchart of FIG. 4.

When the user inputs a reinjection instruction to the arithmetic processing unit 100 after the fractionation and collection of a sample is completed, the arithmetic processing unit 100 displays a chromatogram of the separated and fractionated sample on the display device 110 (Step 101). The chromatogram is displayed in such a manner that each fractionated portion can be recognized. The user can designate, on the displayed chromatogram, a portion for which to perform further separation and fractionation (refractionation) or further analysis (reanalysis). The reinjection sample determination part 102 determines the portion designated on the chromatogram by the user as a sample to be reinjected (Step 102), and further determines based on an instruction from the user whether to refractionate or reanalyze the sample (Step 103).

When the sample to be reinjected is determined, the control device 16 identifies a container housing the sample to be reinjected based on the information transmitted from the arithmetic processing unit 100 (Step 104), injects the target sample into the mobile phase from the liquid delivery device 2A using the injecting part 20A in a case where refractionation is executed, and injects the target sample into the mobile phase from the liquid delivery device 2B using the injecting part 20B in a case where reanalysis is executed (Step 105).

Note that, the embodiment described above is configured so that the liquid chromatograph for separation and fractionation and the liquid chromatograph for analysis are built. However, the present invention is not limited to this, and the configuration may be such that only the liquid chromatograph for separation and fractionation is built. In a case where only the liquid chromatograph for separation and fractionation is built, the liquid delivery device 2B, the detector 10B, the separation column 14B, the injecting part 20B, the inlet switching valve 24B, and the outlet switching valve 25B are unnecessary.

The embodiment described above is merely an example of embodiments of the preparative chromatography system according to the present invention. An embodiment of the preparative chromatography system according to the present invention is as shown below.

One embodiment of the preparative liquid chromatography system according to the present invention includes a liquid delivery part that feeds a mobile phase, a separation column for separating a sample transported by the mobile phase, a plurality of liquid handlers, each of which independently including a container arrangement portion in which a plurality of containers for containing a sample are disposed, an injecting part configured to suck a sample from a container disposed in the container arrangement portion and hold it, and to inject the sample into a mobile phase fed by the liquid delivery part by being interposed between the liquid delivery part and the separation column, and a fractionation part configured to collect a sample eluted from the separation column so that the sample is fractionated to containers disposed in the container arrangement portion, an injection switching part configured to selectively interposes one of the injectors of the plurality of liquid handlers between the liquid delivery part and the separation column by switching connection of channels at a position between the liquid delivery part and the separation column, and a fractionation switching part configured to selectively connect one of the fractionation parts of the plurality of liquid handlers to downstream of the separation column by switching connection of channels at a position downstream of the separation column.

In a first aspect of the embodiment, each injecting part of the plurality of liquid handlers has substantially the same internal capacity as each other, and each internal capacity of channels connecting the injecting part of the plurality of liquid handlers with the injection switching part is substantially the same as each other. According to such an aspect, even in a case where the sample is injected using any of the liquid handlers, the internal capacity in the system up to the separation column becomes uniform and the influence of an individual difference between the liquid handlers on the separation data is reduced.

According to a second aspect of the embodiment, each injecting part of the plurality of liquid handlers has an inlet port and an outlet port, and the injection switching part includes an inlet switching valve and an outlet switching valve, the inlet switching valve is configured to selectively fluidly connects one of channels leading to the inlet port of each of the injecting parts to the liquid delivery part, and the outlet switching valve is configured to selectively fluidly connect one of channels leading to the outlet port of each injecting parts to the separation column. In this case, the inlet switching valve and the outlet switching valve are interlocked with each other. This second aspect can be combined with the first aspect.

A third aspect of the embodiment includes a detector for detecting a sample separated in the separation column, and a control device configured to control operation of each of the plurality of liquid handlers, the injection switching part, and the fractionation switching part based on a detection signal acquired by the detector so that the sample eluted from the separation column is collected in the containers disposed in the container arrangement portion of any of the liquid handlers. According to such an aspect, a sample can be fractionated and collected in a container disposed in any of a plurality of the liquid handlers. This third aspect can be combined with the first aspect and/or the second aspect described above.

As a preferred embodiment of the third aspect, there is one that further includes a reinjection sample determination part configured to determine a sample to be reinjected among collected samples in the containers, in which the control device is configured to control operation of each of the plurality of liquid handlers, the injection switching part, and the fractionation switching part so that the sample to be reinjected determined by the reinjection sample determination part is sucked from the container and is injected into the mobile phase fed by the liquid delivery part. According to such an aspect, it is possible to automatically reinject an optional sample among samples fractionated and collected in the liquid handler.

A specific example of the above preferred embodiment further includes a second separation column provided separately from the separation column, each liquid handler comprises a second injecting part configured to suck a sample from a container disposed in the container arrangement portion and hold it, and to inject the sample into the mobile phase fed by the liquid delivery part by being interposed between the liquid delivery part and the second separation column, the injection switching part is configured to selectively interposes one of the second injectors of the plurality of liquid handlers between the liquid delivery part and the second separation column by switching connection of channels at a position between the liquid delivery part and the second separation column, and the control device is configured to control operation of each of the plurality of liquid handlers, the injection switching part, and the fractionation switching part so that the sample to be reinjected determined by the reinjection sample determination part is sucked from the container and is injected into a mobile phase fed by the liquid delivery part.

As a further specific configuration of the above example, there is a configuration in which each second injecting part of the plurality of liquid handlers has an inlet port and an outlet port, and the injection switching part includes a second inlet switching valve and a second outlet switching valve, the second inlet switching valve is configured to selectively fluidly connect one of channels leading to the inlet port of each second injecting part to the liquid delivery part, and the second outlet switching valve is configured to selectively fluidly connect one of channels leading to the outlet port of each second injecting part to the second separation column.

Further, in the above preferred embodiment, the reinjection sample determination part may be configured to determine a portion designated by a user on a chromatogram created based on a detection signal obtained by the detector as the sample to be reinjected. In this manner, the user can optionally identify a sample to be reinjected while referring to the chromatogram, and reinjection of the sample designated by the user is automatically executed.

DESCRIPTION OF REFERENCE SIGNS

2 Liquid delivery part
2A, 2B Liquid delivery device
4 Injection switching part
6-1 to 6-$n$ Liquid handler
8 Column oven
10A, 10B Detector
12 Fractionation switching part
14A, 14B Separation column
16 Control device
18 Container arrangement portion
20A, 20B Injecting part
22 Fractionation part
24A, 24B Inlet switching valve
25A, 25B Outlet switching valve
26A, 26B, 28A, 28B, 34A, 34B, 36A, 36B, 40, 42 Pipe
30A, 30B Inlet port
32A, 32B Outlet port
100 Arithmetic processing unit
102 Reinjection sample determination part
110 Display device

What is claimed is:

1. A preparative liquid chromatography system, comprising:
    a liquid delivery part that feeds a mobile phase;
    a separation column for separating a sample transported by the mobile phase;
    a plurality of liquid handlers, each of which independently including a container arrangement portion in which a plurality of containers for containing a sample are disposed, an injecting part configured to suck a sample, which is collected by a fractionation part, from a container disposed in the container arrangement portion, and to inject the sample into the mobile phase fed by the liquid delivery part, and the fractionation part configured to collect a sample eluted from the separation column so that the sample is fractionated to containers disposed in the container arrangement portion;
    an injection switching part configured to selectively interpose one of the injecting parts of the plurality of liquid handlers between the liquid delivery part and the separation column by switching connection of channels at a position between the liquid delivery part and the separation column; and
    a fractionation switching part configured to selectively connect one of the fractionation parts of the plurality of liquid handlers to downstream of the separation column by switching connection of channels at a position downstream of the separation column.

2. The preparative liquid chromatography system according to claim 1, wherein
    each injecting part of the plurality of liquid handlers has substantially the same internal capacity as each other, and
    each internal capacity of channels connecting each injecting part of the plurality of liquid handlers with the injection switching part is substantially the same as each other.

3. The preparative liquid chromatography system according to claim 1, wherein
    each injecting part of the plurality of liquid handlers has an inlet port and an outlet port, and
    the injection switching part includes an inlet switching valve and an outlet switching valve, the inlet switching valve is configured to selectively fluidly connect one of channels leading to the inlet port of each injecting part to the liquid delivery part, and the outlet switching valve is configured to selectively fluidly connect one of channels leading to the outlet port of each injecting part to the separation column.

4. The preparative liquid chromatography system according to claim 1, further comprising:
    a detector for detecting a sample separated in the separation column; and
    a control device configured to control operation of each of the plurality of liquid handlers, the injection switching part, and the fractionation switching part based on a detection signal acquired by the detector so that the sample eluted from the separation column is corrected in the containers disposed in the container arrangement portion of any of the liquid handlers.

5. The preparative liquid chromatography system according to claim 4, further comprising a reinjection sample determination part configured to determine a sample to be reinjected among collected samples in the containers, wherein
    the control device is configured to control operation of each of the plurality of liquid handlers, the injection switching part, and the fractionation switching part so that the sample to be reinjected determined by the reinjection sample determination part is sucked from the container and is injected into the mobile phase fed by the liquid delivery part.

6. The preparative liquid chromatography system according to claim 5, further comprising a second separation column provided separately from the separation column, wherein
    each liquid handler comprises a second injecting part configured to suck a sample from a container disposed in the container arrangement portion and hold it, and to inject the sample into the mobile phase fed by the liquid delivery part by being interposed between the liquid delivery part and the second separation column,
    the injection switching part is configured to selectively interposes one of the second injecting parts of the plurality of liquid handlers between the liquid delivery part and the second separation column by switching connection of channels at a position between the liquid delivery part and the second separation column, and
    the control device is configured to control operation of each of the plurality of liquid handlers, the injection switching part, and the fractionation switching part so that the sample to be reinjected determined by the reinjection sample determination part is sucked from the container and is injected into the mobile phase fed by the liquid delivery part.

7. The preparative liquid chromatography system according to claim 5, wherein the reinjection sample determination part is configured to determine a portion designated by a user on a chromatogram created based on a detection signal obtained by the detector as the sample to be reinjected.

8. The preparative liquid chromatography system according to claim 6, wherein
    each second injecting part of the plurality of liquid handlers has an inlet port and an outlet port, and
    the injection switching part includes a second inlet switching valve and a second outlet switching valve, the second inlet switching valve is configured to selectively fluidly connect one of channels leading to the inlet port of each second injecting part to the liquid delivery part, and the second outlet switching valve is configured to selectively fluidly connect one of channels leading to the outlet port of each second injecting part to the second separation column.

* * * * *